May 19, 1970    J. WATANABE ET AL    3,513,033
DRY CELL

Filed April 29, 1968    3 Sheets-Sheet 1

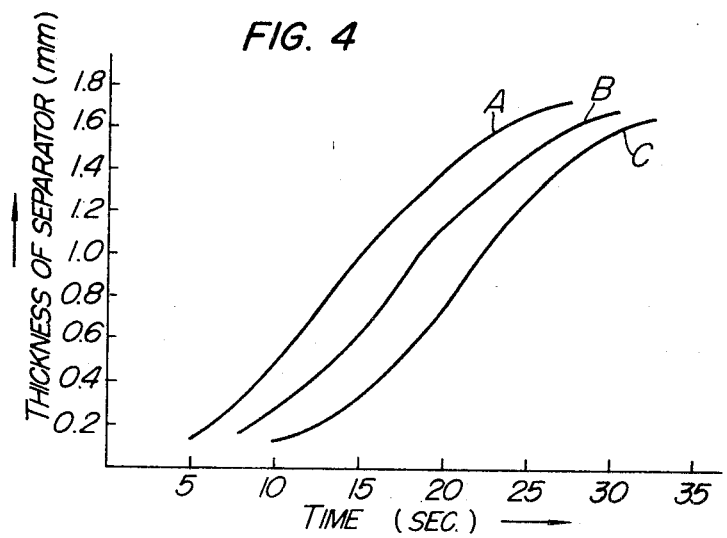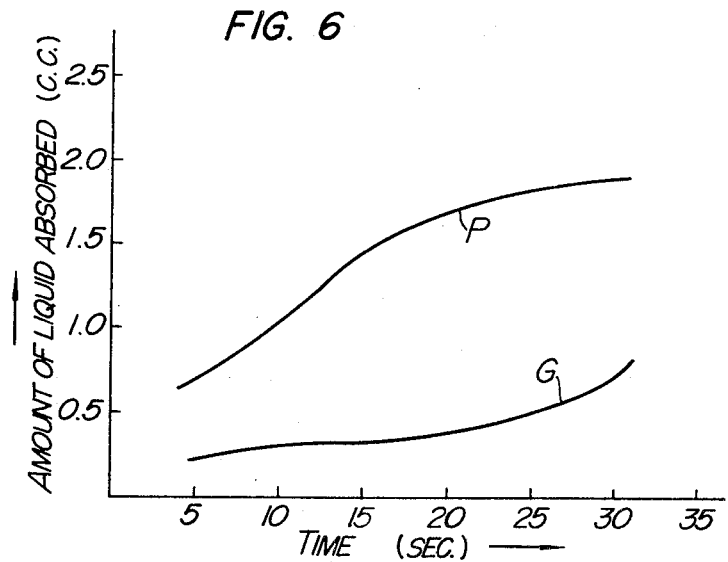

United States Patent Office 3,513,033
Patented May 19, 1970

3,513,033
DRY CELL
Jun Watanabe, Kobe, Susumu Hosoi, Osaka, Masahiro Kuwazaki, Moriguchi-shi, Tadashi Sawai, Kyoto, and Hirota Ueno, Hirakata-shi, Japan, assignors to Matsushita Electric Industrial Co., Ltd., Osaka, Japan, a corporation of Japan
Filed Apr. 29, 1968, Ser. No. 724,689
Claims priority, application Japan, May 6, 1967, 42/29,291, 42/29,294, 42/29,295
Int. Cl. H01m 21/00
U.S. Cl. 136—107                     13 Claims

ABSTRACT OF THE DISCLOSURE

A dry cell comprising a zinc casing serving as the negative electrode, a cathodic mixture disposed in said zinc casing, a separator interposed between said zinc casing and said cathodic mixture, and an electrolyte retained in said separator, said separator being composed of a paste powder and a thermoplastic resin powder which will form, upon being fused with heat, a net structure capable of retaining said paste powder therein, and said electrolyte being retained by said paste powder gelatinized within said net structure.

---

The present invention relates to a dry cell with an improved separator which constitutes a retainer for the electrolyte and by which a cathodic mixture and a zinc casing serving as the negative electrode are separated from each other. More in particular, the present invention relates to such a dry cell which comprises a zinc casing serving as the negative electrode, a cathodic mixture disposed in said zinc casing, a separator interposed between said zinc casing and said cathodic mixture, and an electrolyte retained in said separator, said separator being composed of a paste powder and a thermoplastic resin powder which will form, upon being fused with heat, a net structure capable of retaining said paste powder therein, and said electrolyte being retained by said paste powder gelatinized within said net structure.

Various methods have heretofore been used for the production of dry cells. One of these methods, which has been used for producing the so-called paste-type dry cell, comprises pouring in a negative electrode-constituting zinc casing a suspension of natural starch in an electrolyte consisting primarily of ammonium chloride and zinc chloride, inserting in said zinc casing a cathodic mixture having the surface thereof coated with a water-soluble film such as polyvinyl alcohol to thereby fill the interspace between said zinc casing and said cathodic mixture with said electrolyte and gelatinizing the starch with heat to fix the electrolyte in position.

The dry cell produced by the method described, however, has as drawback that the separator having the electrolyte fixed therein by the gelatinized starch is displaced eccentric to the axis of the zinc casing upon insertion of the cathodic mixture unless said separator has a thickness greater than a certain value which is 2 mm. at the present, and as a result an internal shorting occurs in the cell or the self-consumption of the zinc casing is accelerated.

If the thickness of the separator is increased, it is impossible to make the diameter of the cathodic mixture large, and thus the capacity of the dry cell is subjected to a restriction. Even if it is feasible to make the diameter of the cathodic mixture large and the thickness of the separator small, the operation of inserting the cathodic mixture into the zinc casing is rendered difficult. Namely, it has been inevitable that the lower edge of the cathodic mixture is broken off by contact with the upper edge of the zinc casing and the fragment of cathodic mixture drops in the separator, causing the aforementioned internal shorting.

In addition, the coating of such material as polyvinyl alcohol, which is applied on the peripheral surface of the cathodic mixture for the purpose of preventing an internal shorting caused by electrically conductive fine particles which are carried on the surface of the cathodic mixture and floating on the surface of the electrolyte upon insertion of said cathodic mixture into the electrolyte, has frequently been a cause of an increasing internal resistance which lowers the capacity of the dry cell. Further, in order to reduce the electrically conductive fine particles floating on the electrolyte, it has been essential for the thickness of the coating to be uniform and accordingly much care has been required in the process of forming the coating and in the maintenance of the apparatus for carrying out such a process. Because of such drawbacks, the detection of defective dry cells, which has been the most serious bottleneck in the production of dry cells, has heretofore been effected by aging the product dry cells for about 1 to 2 weeks, in preparation for a voltage test, to wait for the possible occurrence of internal shorting in particular which can be attributed to the production process and thereafter sending to the successive finishing step only those dry cells which have passed the voltage test.

Such a method of inspection not only requires space and labor for the storage of the gelatinized dry cell for a period of 1 to 2 weeks but also renders the production process complicated since the steps before gelatinization of the separator cannot be combined directly with the finishing step, and consequently the production efficiency is lowered.

Furthermore, for fixing the separator by gelatinizing the natural starch suspended in the electrolyte, the following two methods have been employed. Namely, one is to heat the dry cell at a temperature of about 80° C. for a period of 2 to 3 minutes, and another is to increase the amount of zinc chloride in the electrolyte or to use a starch which has previously been processed so that it may be gelatinized at normal temperature, so as to effect gelatinization of the starch without heating the dry cell.

The former method, wherein the starch is gelatinized with heat, necessitates a cooling step to be combined with the heating step for cooling the dry cell after heating for a predetermined period, so as to avoid excessive gelatinization of the starch, and such cooling step obviously makes the production process further complicated and also requires space for the cooling operation.

On the other hand, the latter method wherein the starch is gelatinized naturally without heating the same, is defective in that it requires a cooling device of large scale to retard the gelatinization of the electrolyte because otherwise the starch would be gelatinized in 20 to 30 minutes at normal temperature to a viscosity which is so high as to make the electrolyte unserviceable. However, even when the starch-containing electrolyte is cooled by the cooling device to a temperature of −5 to −15° C., it is impossible to retard the gelatinization satisfactorily and the electrolyte can be maintained in a satisfactory state for 2 to 3 hours at the longest.

Still further, the method of gelatinizing the starch with heat has the serious drawback that the cathodic mixture is loosened or tends to be dried, with a consequent increase of internal resistance. This is true of the naturally gelatinized dry cell, namely the cathodic mixture is loosened or the internal resistance is increased with the electrolyte absorbed thereby during a period of 15 to 23 minutes which is required for the gelatinization of the starch after insertion of the cathodic mixture into the zinc casing.

In order to obviate the foregoing drawbacks, the so-called paper-type dry cell has been proposed, in which the cathodic mixture is wrapped with wrapping paper before it is inserted in the electrolyte-containing zinc casing, said wrapping paper being prepared by coating one side face of a separator paper, such as kraft paper or filter paper, with a starchy material, namely a paste, and drying the same.

Therefore, in the paper-type dry cell, the thickness of the separator is the sum of the thickness of the kraft paper or filter paper and the thickness of the paste layer formed on one side face of said paper, and is about 0.5 to 1.0 mm. which is much smaller than that of the separator in the paste-type dry cell. Further, because of being wrapped with wrapping paper, there is no danger of the cathodic mixture being broken off by direct contact with the zinc casing during insertion of the former into the lattter, and the cathodic mixture and the zinc casing can be separated from each other positively, whereby undesirable phenomena such as internal shorting can be prevented entirely. Still further, since the separator in this type of dry cell is substantially smaller in thickness than the paste-type dry cell, it is possible to increase the amount of cathodic mixture to be disposed in the zinc casing and thereby to improve the charging property of the cell. Besides the above, with the dry cell of the type described, the internal shorting caused by electrically conductive fine particles floating on the electrolyte as has been experienced with the paste-type dry cell can be avoided because the surface of the cathodic mixture is wrapped in wrapping paper, and further there is no need for covering the peripheral surface of the cathodic mixture with a water-soluble film such as polyvinyl alcohol, so that an increase in internal resistance can be prevented.

In the paper-type dry cell, the wrapping paper such as kraft paper or filter paper only serves as a separator and therefore the thickness of the paper is desired to be as thin as possible for the prevention of an increase of internal resistance.

In practice, however, the thickness of the wrapping paper cannot be made smaller than 0.15 mm. from the point of view of strength, because use of an excessively thin paper will result in rupture during the paste coating operation or in the formation of wrinkles during the drying step, and thus the paper has still been a cause of increasing internal resistance.

Further, in the case of the paper-type dry cell, the steps of cutting the paste-coated wrapping paper into a predetermined size and curling said paper into a cylindrical shape are required to facilitate wrapping of the cathodic mixture therewith, and it is possible that the paste material is partially detached from the separator paper during these steps. As a result, the paper loses its function as an electrolyte retaining material, causing local corrosion of the zinc casing. Additionally, this method requires the operation of wrapping the cathodic mixture with the paper, which makes the process further complicated. Thus, the method is not adapted for mass production.

Under the circumstances, the so-called film-type dry cell has been proposed which is a further improvement of the paper-type dry cell. The film-type dry cell is of the type wherein an ion-permeable film, for instance, of acetylcellulose or a film of water-soluble, water-swelling cellulose derivative such as methyl cellulose or carboxymethyl cellulose, formed on the inner surface of the zinc casing is used as a separator for retaining the electrolyte therein. With this dry cell, since the film is formed on the inner surface of the zinc casing serving as the negative electrode, the cathodic mixture can be inserted in the zinc casing without contacting it directly with said zinc casing and therefore no internal shorting will occur at all. Further, by reducing the thickness of the film serving as a separator, the amount of the cathodic mixture in the zinc casing can be increased, and the production efficiency can be enhanced since there is no necessity for wrapping the cathodic mixture with wrapping paper as is done in the paper-type dry cell. On the other hand, however, it is essential to form the film on the inner surface of the zinc casing in a uniform thickness and for this purpose it is absolutely necessary to prepare a solution of ion-permeable material such as acetylcellulose or a cellulose derivative such as methyl cellulose or carboxymethyl cellulose with a considerably low viscosity and to apply it uniformly.

However, the zinc casing does not absorb such a solution at all and only a one-time coating of the solution does not produce a film of a substantial thickness which will produce a sufficient separating effect and which will not be ruptured during insertion of the cathodic mixture. In view of this, the solution must be coated repeatedly 2 or 3 times. However, the formation of a uniform film by repetitive coating of the solution on the inner surface of the zinc casing is practically extremely difficult, because, since the zinc casing does not absorb the solution as described above, the solution flows on the surface of the zinc casing and such a flow of the solution occurs more notably as the number of coating operations increases, resulting in uneven thickness of the film formed which in turn will accelerate the self-consumption of the zinc casing.

Furthermore, the film formed on the inner surface of the zinc casing must be dried at a temperature of 50 to 70° C. for a period of about 3 to 6 hours before the cathodic mixture is inserted in the casing, so as to produce sufficient mechanical strength in said film, because if the cathodic mixture is inserted in the casing immediately after formation of the film, the film is broken by the cathodic mixture on contact therewith and thereby an internal shorting will result. Since a lengthy period is required for the steps of coating the film-forming solution and drying the resultant film, the dry cell of this type cannot be produced on a continuous basis.

Still further, when a water-soluble, water-swelling paste such as methyl cellulose or carboxymethyl cellulose is used as film-forming material, hydrolysis of the paste material occurs during discharging of the dry cell due to a lowering of pH of the electrolyte retaining separator or a rise in concentration of the zinc chloride and the resulting water is absorbed by the cathodic mixture. Consequently, the separator does not serve its primary function as a separator and an internal shorting occurs in the course of discharge.

On the other hand, when an ion-permeable material such as acetyl-cellulose, which is insoluble in water and electrolyte, is used for the formation of a film, the film has a poor retention of electrolyte and the water resulting from the discharge reaction is not absorbed, so that the internal resistance of the cell increases and the discharge property of the cell after storage is degraded in particular.

An object of the present invention is to provide a dry cell of excellent workability wherein a separator is formed of a cellulose derivative powder, synthetic paste powder, processed starch powder, natural starch powder or natural rubber powder, or a mixture thereof, with added thermoplastic resin powder.

Another object of the present invention is to provide a dry cell having a good storage property and discharge property, wherein the amount of cathodic mixture is increased by the use of a separator between the cathodic mixture and a zinc casing serving as the negative electrode which separator is thin in thickness and excellent in separating effect.

Still another object of the present invention is to provide a dry cell which can be produced on an industrial scale, and is adapted for mass production and cheap in cost.

Other features and advantages of the present invention will become apparent from the following detailed description when taken in conjunction with the accompanying drawings, in which:

FIG. 4 is a chart illustrating the relationships between the thickness of a separator film and the heating time;

FIG. 6 is a chart illustrating the relationships between the liquid absorption and time, of the inventive dry cell and the so-called film-type dry cell.

Figure 1:
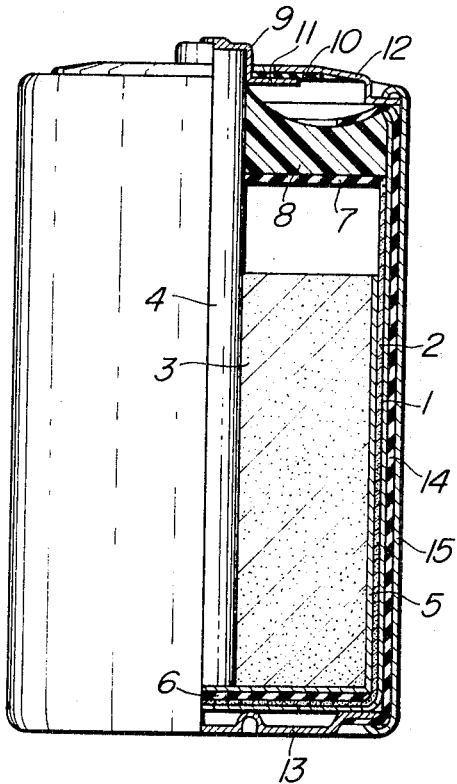
FIG. 1 is a side view, with a half portion shown in section, of a dry cell according to the present invention.

In a preferred embodiment of the present invention, the separator is formed of a mixture of a paste material consisting of a cellulose derivative powder, such as methyl cellulose or carboxymethyl cellulose, and a thermoplastic resin powder, such as polyethylene powder, powder of polyethylene-polyvinyl acetate copolymer or polyvinyl acetate powder, which has a melting point of 90 to 180° C. and a size of 80 to 350 meshes. The mixed powder is melt-bonded to the inner surface of a zinc casing integrally therewith, by filling said zinc casing with said mixed powder and heating the zinc casing to a temperature higher than the aforesaid melting point of the thermoplastic resin, whereby a net structure of thermoplastic resin is formed with the paste powder retained therein.

Methyl cellulose or carboxymethyl cellulose is a paste material which dissolves or swells on absorption of water, without being heated. The powder of polyethylene, polyethylene-polyvinyl acetate copolymer or polyvinyl acetate is insoluble in water or electrolyte and stable chemically. This thermoplastic resin is preferably admixed with the paste powder in an amount of 50 to 80 parts per 50 to 20 parts of the latter, in view of the fact that an amount greater than that specified will result in a high internal resistance of the separator, whereas an amount smaller than that specified will result in an insufficient amount of the paste powder being retained by said separator. The mixture of the paste powder and the thermoplastic resin powder can be attached to the inner surface of the zinc casing by previously heating the zinc casing at a temperature higher than the melting point of said thermoplastic resin powder, e.g. a temperature higher than 180° C., filling the zinc casing with said mixed powder and retaining the same therein for 2 to 3 seconds and thereafter removing the excess mixed powder from said zinc casing, or alternatively by filling the zinc casing with the mixed powder, heating the zinc casing at a temperature of 90 to 180° C. for 5 to 15 seconds and thereafter removing the excess powder not having been attached to the inner surface of the zinc casing from said zinc casing.

Upon contacting the heated inner surface of the zinc casing, the thermoplastic resin powder in the mixed powder is softened and the individual particles of said resin are melt-bonded with each other forming a net structure. Simultaneously, these particles are bonded to the inner surface of the zinc casing at the sides which are in contact with said surface of the zinc casing. The paste powder and unmelted particles of the thermoplastic resin powder are retained in the net structure thus formed, whereby a separator is produced. Immediately after the mixed powder is attached to the inner surface of the zinc casing, the mixed powder is rolled under pressure or heated again, so as to eliminate the pin holes and thereby produce a separator of thin, uniform thickness.

The rolling of the mixed powder, attached on the inner surface of the zinc casing, under pressure or reheating of the same causes the fear of said powder being formed into a film or the meshes in the net structure being reduced to an excessively small size, thereby degrading the electrolyte absorbing and retaining property of the final separator. Such fear may be eliminated entirely by adding to the mixed powder 10 to 20% of a 80 to 150 mesh pulp powder having good liquid-absorbing property as an electrolyte retaining material. Besides the pulp powder, a powder processed starch, such as cross-linking starch, or a powder of natural starch, such as corn starch, wheat flour or glutinous rice, may also be used as an electrolyte retaining material.

Although the separator can be formed on the inner surface of the zinc casing by using a thermoplastic resin having a melting point higher than 150° C., the melting point of the thermoplastic resin used is preferably not higher than 150° C. so as to avoid deterioration of the paste powder. The zinc casing serving as the negative electrode may be heated in a heating drier or the like, or by a steel which is contacted with the outer surface of the zinc casing. When the zinc casing is molded from zinc pellets by impact molding, the temperature of the molded zinc casing drops from the molding temperature of 220 to 260° C. to a temperature of 140 to 150° C. about 15 to 25 seconds after molding, so that this residual heat in the molded zinc casing may also be used.

In order to attach the mixed powder uniformly on the inner surface of the zinc casing, it is essential to effect pouring and removal of the mixed powder into or from the zinc casing smoothly as well as to impart a good fluidity to the mixed powder. For this purpose, it is recommendable to add to the mixed powder from about 0.1 to 3% of a fine silicon dioxide powder having a particle size of 5 to 50 m$\mu$. By the addition of such silicon dioxide powder, it is possible to improve the fluidity of the mixed powder, to effect the operation of pouring and removing the mixed powder into and from the zinc casing smoothly and thereby to attach the mixed powder uniformly on the inner surface of said zinc casing. Besides the addition of silicon dioxide powder, a uniform layer of mixed powder may also be obtained on the inner surface of the zinc casing by using a thermoplastic resin, e.g. polyethylene, copolymer of polyethylene and polyvinyl acetate or polyvinyl acetate, in the form of a short fiber, preferably a short fiber of 0.1 to 0.5 mm. in length, whereby the mixed powder can be attached on the inner surface of the zinc casing evenly.

As described previously, formation of pin holes in the final separator formed on the inner surface of the zinc casing can be avoided by rolling under pressure or reheating of the mixed powder attached to said surface. Alternatively, polyethylene glycol may be added to the mixed powder, so that when the net structure is formed on the inner surface of the zinc casing with the synthetic resin powder attached thereto and heated, the paste powder and unmelted synthetic resin powder, retained in the meshes of said net structure, may be covered with said polyethylene glycol, whereby the interspaces between the powder particles are filled with said polyethylene glycol. The polyethylene glycol used for this purpose preferably has a molecular weight of 1000 to 6000 and a melting point of 50 to 65° C., and is used in an amount of 5 to 20% with respect to the amount of mixed powder. If the amount of polyethylene glycol added is too small, the interspaces between the particles cannot be filled sufficiently, while if the amount is too large, the relative amount of the paste powder will be decreased and a satisfactory separating effect cannot be obtained of the resulting separator. Besides the means described above, the pin holes in the separator may be eliminated by swelling the separator, formed on the inner surface of the zinc casing, with water or the electrolyte so as to close the interspaces between the powder particles with the swollen paste particles and thereafter drying the separator to produce a film, or by adding a surface activator to the mixed powder to accelerate dissolution or swellinging of the paste powder. By either method, the paste powder particles are fastly bonded in the meshes of the net structure formed on the inner surface of the zinc casing with the thermoplastic resin powder and will not be readily detached therefrom.

The cathodic mixture to be inserted into the zinc casing, with the mixed powder attached to the inner surface thereof, is composed primarily of manganese dioxide, acetylene black, graphite and ammonium chloride, and molded into a columnar shape with a carbon rod embedded centrally thereof, said carbon rod serving as positive electrode. Alternatively, the cathodic mixture may be previously humidified excessively and provided in a columnar shape with no carbon rod embedded therein. For producing a dry cell using a cathodic mixture having a carbon rod embedded in the center thereof, the electrolyte composed of ammonium chloride, zinc chloride and water is poured in a zinc casing having a separator formed on the inner surface thereof by attaching thereto the mixed powder, and the cathodic mixture is inserted into the zinc casing forcing said electrolyte to rise between it and the separator and thereafter dissolving or swelling the paste powder in the separator.

In this case, a film of sodium alginate is previously formed on the surface of the cathodic mixture. Upon inserting the cathodic mixture into the zinc casing, the zinc chloride in the electrolyte reacts with the sodium alginate to change it into a zinc alginate film. This film is permeable to ions but prevents the transfer of the electrolyte from the separator side to the cathodic mixture side by passing therethrough.

For producing a dry cell using a cathodic mixture which has been humidified excessively beforehand and does not have a carbon rod embedded centrally thereof, the cathodic mixture is first disposed in the zinc casing and then the carbon rod is put through the center of the cathodic mixture, thereby reshaping said cathodic mixture and also exuding the electrolyte therefrom to dissolve or swell the paste powder in the separator. In this case, therefore, an ion-permeable film is not forming on the cathodic mixture. However, since the separator is not subjected to deformation during insertion of the cathodic mixture, a film of sodium alginate may be previously formed on the surface of the separator so as to prevent the electrolyte, having moved to the separator side, from moving back to the cathodic mixture side therethrough.

Besides the zinc alginate, a film of acetylcellulose may also be used as ion-permeable film.

An embodiment of the present invention will be described with reference to the accompanying drawings.

Referring to FIG. 1, a zinc casing 1 constituting the negative electrode has a separator 2 formed on the inner surface thereof. The separator 2 is formed by mixing 30 parts of methylcellulose, 20 parts of polyvinyl alcohol, 10 parts of pulp powder and 40 parts of polyethylene-polyvinyl acetate copolymer as being a thermoplastic resin, adding to the mixture 0.1% of silicon dioxide powder, filling the resultant mixture in the zinc casing which has previously been heated in a heating drier to a temperature of 110° C. for 10 minutes, keeping the mixture in said zinc casing for 2 to 3 seconds and immediately removing the excess mixture from said zinc casing.

Pulp powder is used for the purpose of improving the liquid absorbing and retaining property of the separator 2, while silicon dioxide powder is used, as explained previously, to improve the fluidity of the mixed powder and thereby to attach the mixed powder uniformly on the inner surface of the zinc casing 1. A cathodic mixture 3 is composed mainly of manganese dioxide, acetylene black and ammonium chloride, and molded into a columnar shape with a carbon rod 4 embedded centrally thereof prior to insertion into the zinc casing. The surface of the cathodic mixture is coated with a film of sodium alginate 5. This cathodic mixture 3 is inserted into the zinc casing 1 after pouring in said zinc casing an electrolyte composed of ammonium chloride, zinc chloride and water. Reference numeral 6 designates a bottom plate placed in the bottom of the zinc casing 1, 7 designates a flange paper and 8 designates a sealing compound consisting, for instance, of pitch and poured on top of the flange paper 7 in a molten state. Upon pouring the sealing compound 8, that portion of the separator which is located above the flange paper 7 is contacted by the molten sealing compound, so that the synthetic resin powder in the separator is completely molten by the heat of said compound to produce an intimate contact between said compound and the inner surface of the zinc casing 1, sealing the interior of the zinc casing air tightly. This will prevent the water content in the cathodic mixture 3 from decreasing and accordingly it is possible to obviate the drawback that the internal resistance is increased and the electron conductivity is deteriorated due to drying of the cathodic mixture during the storage or discharge operation.

At the top end of the carbon rod 4 is provided a positive electrode terminal cap 4. Between a flange 11 of the positive electrode terminal cap 9 and a metallic sealing plate 12 is interposed an insulating ring 10. The bottom end of the zinc casing 1 rests on a negative electrode terminal plate 13. The exterior surface of the zinc casing 1 is covered by a kraft cylinder 14 which has the upper and lower edges thereof overlapping the shoulder of the sealing compound 8 and the peripheral edge portion of the negative electrode terminal plate 13 respectively. The kraft cylinder 14 is further surrounded by a metallic outer casing 15.

Figure 2:
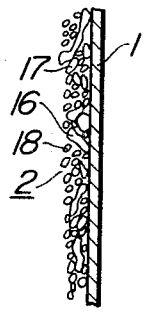
FIG. 2 is an enlarged fragmentary cross-sectional view of a portion of the zinc casing of the dry cell shown in FIG. 1.
Figure 3:
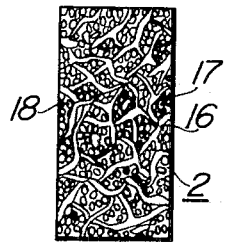
FIG. 3 is a front view of the portion shown in FIG. 2.

With reference to FIGS. 2 and 3, reference numeral 16 designates the polyethylene-polyvinyl acetate copolymer particles molten with heat, 17 designates the unmelted resin particles and 18 designates the methylcellulose particles. As is clearly seen in FIG. 3, the methylcellulose particles 18 and the unmelted resin particles 17 are retained between the meshes of a net structure formed of molten resin particles 16.

The dry cell produced in the manner described is advantageous in that the separator can be formed in a very short period by the simple step of heating the zinc casing and attaching the mixed powder of the thermoplastic resin and the paste to the inner surface of said zinc casing. Namely, the dry cell according to the present invention does not call for the steps of adjusting the viscosity of an electrolyte in which starch is suspended, heating the electrolyte to gelatinize said starch and cooling the heated electrolyte, and devices for carrying out said steps, which are required in the production of the so-called paste-type dry cell.

The dry cell of this invention is also advantageous over the so-called paper-type dry cell in that a series of operations including cutting a separator consisting of kraft paper or filter paper having one side face coated with an electrolyte into a predetermined size, shaping said paper into a cylindrical shape and wrapping a cathodic mixture with said cylindrical paper, as required in the production process of the latter, can be eliminated entirely.

The dry cell of the present invention is also advantageous over the so-called film-type dry cell, because in the production of the former, the steps of adjusting the viscosity of a paste solution, applying the paste solution on the inner surface of a zinc casing repeatedly and drying the resultant layer of the paste material, as required in the production of the latter, can be omitted.

Consequently, the dry cell of this invention can be produced by a simpler process and accordingly with higher efficiency than any one of the conventional ones and is adapted for mass production.

It should also be noted that according to the dry cell of this invention, the amount of the separator-forming mixed powder to be attached to the inner surface of the zinc casing can be adjusted optionally to a thickness of 0.2 mm. or greater by varying the temperature to which the zinc casing is heated and the retention time of the mixed powder in the zinc casing. The relationships between the temperature of the zinc casing and the mixed powder retention time are shown in FIG. 4. These relationships were obtained by heating the zinc casing after filling it with the mixed powder which is composed of 50 parts of polyethylene particles having a molecular weight of 20,000 and a particle size of 150 mesh and 50 parts of methylcellulose particles having a particle size of 100 mesh. In the chart of FIG. 4, curve A represents the relationship when the zinc casing was heated to 160° C., curve B represents the relationship when the zinc casing was heated to 140° C. and curve C represents the relationship when the zinc casing was heated to 120° C.

Therefore, even when the diameter of the cathodic mixture is made large to increase the amount thereof by reducing the thickness of the separator to 0.2 to 0.3 mm., the inner surface of the zinc casing is completely covered with the separator. In addition, since the separator has a sufficient separating effect with the thermoplastic resin particles melt-bonded to the inner surface of the zinc casing forming a net structure, direct contact between the cathodic mixture and the zinc casing during insertion of the former into the latter can be prevented sufficiently and thereby the storage property of the dry cell can be improved. Further, according to the present invention, internal shorting caused by the contact of electrically conductive fine particles, carried on the surface of the cathodic mixture and floating in the electrolyte, with the zinc casing can be avoided completely, so that there is no need for forming a water-soluble film on the surface of the cathodic mixture for the purpose of preventing such electrically conductive fine particles from floating in the electrolyte. Therefore, it is possible to avoid an increase in internal resistance. This plus the large amount of cathodic mixture enables the discharge capacity of the dry cell to be improved drastically.

Figure 5:
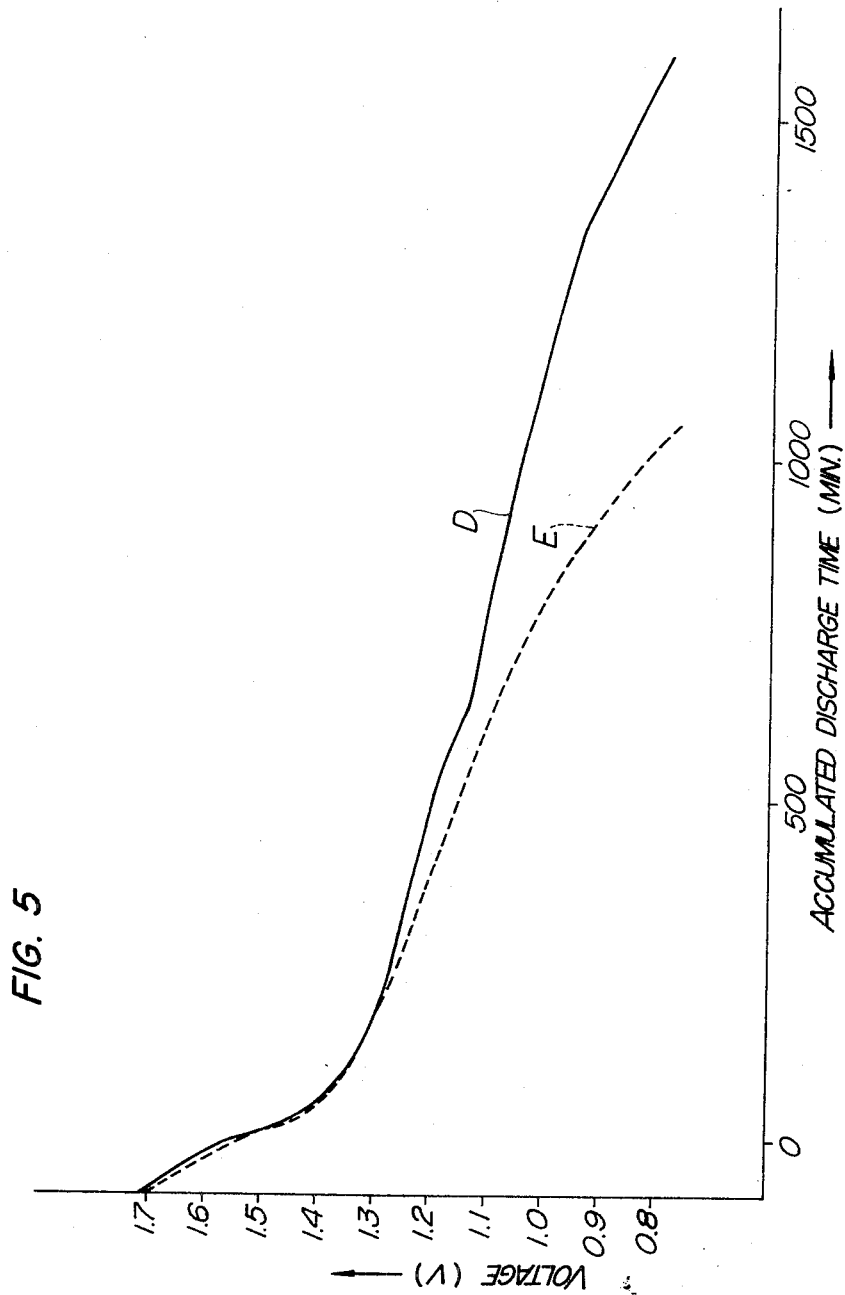
FIG. 5 is a chart illustrating the intermittent discharge curves of the dry cell of this invention and the so-called paste-type dry cell.

Then, a mixture of 50 parts of manganese dioxide, 5 parts of acetylene black, 5 parts of graphite, 3 parts of zinc chloride, 17 parts of ammonium chloride and 20 parts of water is molded to form a columnar cathodic mixture having a diameter of 28.0 mm., a height of 42.0 mm. and a net weight of 48 g. On the other hand, a mixture of 30 parts of methylcellulose powder, 20 parts of polyvinyl alcohol powder, 10 parts of pulp powder and 40 parts of polyethylene-polyvinyl acetate copolymer powder, is filled in the zinc casing and heated at 150° C. for 10 seconds. After removing excessive mixed powder, the zinc casing is again heated at 150° C. for 10 seconds and thereafter the layer of the mixed powder on the inner surface of the zinc casing is rolled to form a separator of 0.3 mm. in thickness. 2.7 cc. of electrolyte composed of 15 parts of ammonium chloride, 15 parts of zinc chloride and 70 parts of water is poured into the zinc casing and then the aforesaid cathodic mixture is inserted into the zinc casing, whereby a UM-1 type dry cell is produced. The dry cell of this invention produced in the manner described and the so-called paste-type dry cell which is of the same size as the former but in which the paste layer is thick and accordingly the diameter of the cathodic mixture is about 10% smaller than that in the former, were connected to a resistance of 4 ohms and discharged at 20° C. for 30 minutes per day and 6 days per week, until the voltages dropped to 0.85 volt. The relationships between the accumulated discharge time and the voltage, on the respective dry cells are shown in FIG. 5. In FIG. 5, curve D represents a discharge curve of the inventive dry cell and curve E represents a discharge curve of the paste-type dry cell. It will be seen from the characteristics shown in FIG. 5 that the dry cell according to this invention is by far superior to the conventional dry cell in respect of discharge capacity.

In the dry cell of this invention, the paste powder will not by hydrolyzed excessively and transfer of the paste material is prevented effectively even when the pH is lowered or the amount of zinc chloride is increased during discharge, owing to the fact that the thermoplastic resin is attached to the inner surface of the zinc casing forming a net structure and the paste powder is rigidly held in the meshes of said net structure. Even if the paste material has been completely hydrolyzed, the flow of the paste material to the cathodic mixture side can be prevented completely by forming an ion-permeable film, such as a zinc alginate film, on the surface of said cathodic mixture. Further, since the separator is composed of the thermoplastic resin particles which are melt-bonded with each other to form a net structure, and is interposed between the cathodic mixture and the zinc casing to prevent direct contact therebetween, an internal shorting can be prevented sufficiently and a stable discharge characteristic can be obtained.

The separator for retaining the electrolyte therein comprises as liquid absorbing and electrolyte retaining ingredient pulp powder or corn starch powder as a part of the paste material, so that the electrolyte is absorbed in the separator quickly in a large amount and accordingly an increase of internal resistance as a result of the loosening of the cathodic mixture upon pouring of electrolyte can be avoided. Thus, the discharge property of the dry cell can be improved.

The relationships between the time and the amount of liquid absorption by the separator in the inventive dry cell and a conventional separator which was formed by coating 5% acetylcellulose solution in acetone three times on the inner surface of a zinc casing, are shown in FIG. 6. In the figure, curve F is the liquid absorption curve of the separator in the inventive dry cell and curve G is that of the conventional separator. These curves were obtained by forming the respective separators on zinc casings of the UM-1 type size, pouring a predetermined quantity of electrolyte in the respective zinc casing and weighing the unabsorbed electrolyte at each unit time. From the results shown in FIG. 6, it will be clear that the separator according to this invention absorbs the electrolyte faster and in a greater amount than the conventional separator comprising acetylcellulose.

Besides the method described previously, the separator in the inventive dry cell may also be obtained by mixing 30 parts of methylcellulose, 20 parts of polyvinyl alcohol, 10 parts of pulp powder and 40 parts of polyethlene-polyvinyl acetate copolymer powder as being thermoplastic resin powder; applying the resultant mixture on a flat belt in a predetermined thickness, e.g. about 1 mm.; passing said belt through a heating furnace at 150 to 180° C., whereby the thermoplastic resin particles in the mixed powder are melt-bonded to each other forming a net structure with the meshes thereof filled with the paste particles; compressing the layer on the belt to a desired thickness (0.3 to 0.5 mm.) by means of a roll to obtain a sheet composed of the paste powder and the net structure of resin; and wrapping the cathodic mixture with said sheet prior to insertion of said cathodic mixture into the zinc casing or attaching said sheet to the inner surface of the zinc casing using a heating roll.

Alternatively, the mixed powder may be molded into a cylindrical shape at 150 to 180° C. by injection molding, so that the cathodic mixture may be fitted in said cylindrical separator. In this case, the cathodic mixture may or may not have the carbon rod embedded centrally thereof. The bond between the separator and the inner surface of the zinc casing may further be improved by adding a powder of synthetic rubber, such as butyl rubber, to the resin powder.

As described hereinabove, according to the present invention, the separator between the zinc casing and the cathodic mixture is formed of a mixture of a paste powder and a thermoplastic resin powder, and therefore a dry cell which is highly efficient and excelling in storage and discharge properties can be produced in large quantities on an industrial scale.

What is claimed is:

1. A dry cell comprising a zinc casing serving as negative electrode, a cathodic mixture disposed in said zinc casing, separator interposed between said zinc casing and said cathodic mixture and an electrolyte retained by said separator, said separator being composed of a mixture of a paste powder and thermoplastic resin powder particles, said thermoplastic resin powder particles being melt-bonded to each other to form a net structure adapted to retain said paste powder therein and said paste powder being gelatinized to retain said electrolyte.

2. A dry cell according to claim 1, wherein said paste powder consists of at least one of cellulose derivative powder, synthetic paste powder, processed starch powder and natural rubber powder.

3. A dry cell according to claim 1, wherein said thermoplastic resin powder consists of at least one of polyethylene, polyethylene-polyvinyl acetate copolymer and polyvinyl acetate.

4. A dry cell according to claim 1, wherein said mixture to form the separator is composed to 50 to 80 parts by weight of the paste powder and 50 to 20 parts by weight of the thermoplastic resin powder.

5. A dry cell according to claim 1, wherein 5 to 12% of polyethylene glycol is added to said mixture of the paste powder and the thermoplastic resin powder used for the formation of a separator.

6. A dry cell according to claim 1, wherein a pulp powder is added to said mixture of the paste powder and the thermoplastic resin powder used for the formation of a separator.

7. A dry cell according to claim 1, wherein an ion-permeable film is formed between the cathodic mixture and the separator.

8. A method of producing the dry cell according to claim 1, comprising the steps of filling a mixture of a paste powder and a thermoplastic resin powder in a zinc casing serving as a negative electrode, heating said zinc casing to a temperature above the melting point of said thermoplastic resin, melt-bonding said thermoplastic resin particles to each other to form a net structure adapted to retain said paste particles in the meshes thereof and simultaneously melt-bonding said net structure to the inner surface of the zinc casing forming a separator and gelatinizing said paste powder with said electrolyte.

9. A method of producing the dry cell according to claim 1, comprising the steps of filling a mixture of a paste powder and a thermoplastic resin powder in a zinc casing serving as negative electrode, heating said zinc casing to a temperature above the melting point of said thermoplastic resin powder, melt-bonding said thermoplastic resin particles to each other to form a net structure, retaining said paste particles in the meshes of the net structure, simultaneously melt-bonding said net structure to the inner surface of the zinc casing forming a separator, and pressing the surface of said separator against the zinc casing so as to uniformalize the structure thereof and gelatinizing said paste powder with said electrolyte.

10. A method of producing the dry cell according to claim 1 comprising the steps of filling a mixture of a paste powder and a thermoplastic resin powder in a zinc casing serving as a negative electrode, heating said zinc casing to a temperature above the melting point of said thermoplastic resin, melt-bonding said thermoplastic resin particles to each other to form a net structure, retaining the paste particles in the meshes of the net structure, simultaneously melt-bonding said net structure to the inner surface of the zinc casing forming a separator, and uniformalizing the structure of said separator by the steps of heating said zinc casing and pressing the surface of said separator against the zinc casing and gelatinizing said paste powder with said electrolyte.

11. A method of producing the dry cell according to claim 1, comprising the steps of filling a mixture of a paste powder and a thermoplastic resin powder in a zinc casing serving as negative electrode, heating said zinc casing to a temperature above the melting point of said thermoplastic resin powder, melt-bonding said thermoplastic resin particles to each other to form a net structure, retaining said paste particles in the meshes of the net structure, simultaneously melt-bonding said net structure to the inner surface of the zinc casing forming a separator, swelling said paste particles with water or an electrolyte, and drying said paste particles to uniformalize the structure of said separator.

12. A method of producing the dry cell according to claim 1 including the steps of heating the mixture of the paste powder and the thermoplastic resin powder to form a film of net structure, retaining the paste particles in the meshes of the net structure and wrapping the cathodic mixture with said film and gelatinizing said paste powder with said electrolyte.

13. A method of producing the dry cell according to claim 1 including the steps of heating the mixture of the paste powder and the thermoplastic resin powder to form a film of net structure, retaining the paste particles in the meshes of the net structure, melt-bonding said film to the inner surface of said zinc casing and inserting the cathodic mixture into said zinc casing and gelatinizing said paste powder with said electrolyte.

References Cited

UNITED STATES PATENTS

| | | | |
|---|---|---|---|
| 2,551,799 | 5/1951 | Hatfield | 136—129 |
| 2,923,757 | 2/1960 | Klopp | 136—107 |
| 3,081,372 | 3/1963 | Soltis | 136—146 |
| 3,314,820 | 4/1967 | Smith | 136—107 |
| 3,328,208 | 6/1967 | Ryhiner et al. | 136—146 |
| 3,329,559 | 7/1967 | Corbin et al. | 136—146 |
| 3,351,495 | 11/1967 | Larsen et al. | 136—146 |
| 3,428,494 | 2/1969 | Watanabe et al. | 136—102 |

WINSTON A. DOUGLAS, Primary Examiner

C. F. LEFEVOUR, Assistant Examiner

U.S. Cl. X.R.

136—146

Notice of Adverse Decision in Interference

In Interference No. 97,589 involving Patent No. 3,513,033, J. Watanabe, S. Hosoi, M. Kuwazaki, T. Sawai, and H. Ueno, DRY CELL, final judgment adverse to the patentees was rendered June 10, 1974, as to claims 1–4, 6 and 12.

[*Official Gazette November 12, 1974.*]